United States Patent [19]

Hansen et al.

[11] Patent Number: 5,132,412

[45] Date of Patent: Jul. 21, 1992

[54] THIAZOLEAZO DYES HAVING A DIAZO COMPONENT FROM THE ISOTHIAZOLE OR THIADIAZOLE SERIES

[75] Inventors: Guenter Hansen, Ludwigshafen; Gunther Lamm, Hassloch; Helmut Reichelt, Neustadt; Ernst Schefczik, Ludwigshafen, all of Fed. Rep. of Germany

[73] Assignee: BASF Aktiengesellschaft, Ludwigshafen, Fed. Rep. of Germany

[21] Appl. No.: 407,748

[22] Filed: Sep. 15, 1989

[30] Foreign Application Priority Data

Oct. 1, 1988 [DE] Fed. Rep. of Germany ....... 3833443
May 26, 1989 [DE] Fed. Rep. of Germany ....... 3917258

[51] Int. Cl.$^5$ .................. C09B 29/039; C09B 29/36; D06P 1/18
[52] U.S. Cl. .................................. 534/765; 534/581; 534/582; 548/193
[58] Field of Search ............... 534/765, 766, 767, 769, 534/795

[56] References Cited

U.S. PATENT DOCUMENTS 3,770,719 11/1973 Fisher et al. ..................... 534/765 X
4,340,537 7/1982 Ellingsfeld et al. ............. 534/795 X
4,619,992 10/1986 Bergmann et al. ............. 534/765 X

FOREIGN PATENT DOCUMENTS 2738885 3/1979 Fed. Rep. of Germany ...... 534/765
3400364 7/1985 Fed. Rep. of Germany ...... 534/765
3433958 3/1986 Fed. Rep. of Germany ...... 534/765

OTHER PUBLICATIONS

Derwent Abstract of JP 57-151653 (1981).
Seybold et al., II, *Chemical Abstracts*, vol. 106, No. 19969b (1987).

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Thiazoleazo dyes of the formula

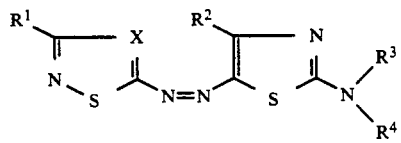

where X is nitrogen or a radical C—$R^5$, $R^5$ being cyano, halogen, alkoxycarbonyl or thiocyanato, $R^1$ is cyano, chlorine, unsubstituted or substituted $C_1$-$C_6$-alkyl, unsubstituted or substituted phenyl, unsubstituted or substituted thienyl, unsubstituted or substituted pyridyl or unsubstituted or substituted alkylthio, alkylsulfinyl or alkylsulfonyl, $R^2$ is unsubstituted or substituted alkyl, cycloalkyl, unsubstituted or substituted phenyl, furyl, unsubstituted or substituted thienyl or pyridyl and $R^3$ and $R^4$ independently of one another are each unsubstituted or substituted alkyl, or $R^3$ and $R^4$, together with the nitrogen atom which links them, form a heterocyclic radical, are used for dyeing textile fibers having good wet fastness and color build-up.

4 Claims, No Drawings

THIAZOLEAZO DYES HAVING A DIAZO COMPONENT FROM THE ISOTHIAZOLE OR THIADIAZOLE SERIES

The present invention relates to novel thiazoleazo dyes of the formula I

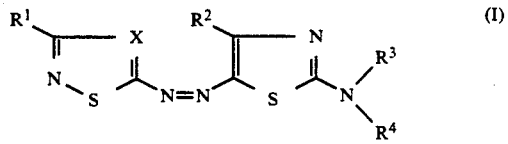

where X is nitrogen or a radical C—$R^5$, $R^5$ being cyano, halogen, $C_1$–$C_4$-alkoxycarbonyl or thiocyanato, $R^1$ is cyano, chlorine, unsubstituted or substituted $C_1$–$C_6$-alkyl, a radical of the formula $Y(CH_2)_mS(O)_p$—, Y being hydrogen, cyano or $C_1$–$C_4$-alkoxycarbonyl, m being 1 or 2 and p being 0, 1 or 2, a radical of the formula $R^6(-OC_2H_4)_n$, $R^6$ being $C_1$–$C_6$-alkyl, $C_5$–$C_7$-cycloalkyl, benzyl or phenyl and n being 1, 2, 3 or 4, unsubstituted or substituted phenyl, thienyl, $C_1$–$C_4$-alkylthienyl, pyridyl or $C_1$–$C_4$-alkylpyridyl, $R^2$ is $C_1$–$C_8$-alkyl, phenoxy-substituted $C_1$–$C_4$-alkyl, $C_5$–$C_7$-cycloalkyl, unsubstituted or substituted phenyl, furyl, thienyl, $C_1$–$C_4$-alkylthienyl, halothienyl or pyridyl, $R^3$ is $C_1$–$C_6$-alkyl, $C_1$–$C_6$-alkyl which is substituted by cyano or phenyl, $C_3$–$C_{12}$-alkyl whose alkyl chain is interrupted by from 1 to 4 oxygen atoms and may be substituted by phenyl or phenoxy, or $C_1$–$C_4$-alkoxy and $R^4$ is $C_1$–$C_6$-alkyl or $C_3$–$C_{12}$-alkyl whose alkyl chain is interrupted by from 1 to 4 oxygen atoms and may be substituted by phenyl or phenoxy, or $R^3$ and $R^4$, together with the nitrogen atom which links them, form a 5-membered or 6-membered saturated heterocyclic radical which may contain further heteroatoms, with the proviso that $R^3$ and $R^4$ are simultaneously $C_1$–$C_6$-alkyl only when $R^1$ has one or more oxygen atoms or is a radical $NC(CH_2)_mS(O)_p$—, m and p each having the abovementioned meanings, and their use for dyeing textile fibers.

DE-A-2 910 806 and JP-A-151 653/1982 disclose azo dyes which have a thiazole derivative as a coupling component. Furthermore, earlier patent applications DE-A-3 810 643 and DE-A-3 816 698 disclose thiazoleazo dyes having a diazo component from the isothiazole series.

It is an object of the present invention to provide novel thiazoleazo dyes which have a diazo component from the isothiazole or thiadiazole series and possess advantageous performance characteristics.

We have found that this object is achieved by the thiazoleazo dyes of the formula I which are defined in detail above.

All alkyl groups occurring in the abovementioned formula I may be either straight-chain or branched.

$R^1$, $R^2$, $R^3$ and $R^4$ are, for example, methyl, ethyl, propyl, isopropyl, butyl, isobutyl, sec-butyl, pentyl, isopentyl, neopentyl, tert-pentyl, hexyl or isohexyl.

$R^1$ is furthermore, for example, $CH_3OC_2H_4$, $C_2H_5OC_2H_4$, $C_6H_5CH_2OC_2H_4$, $C_6H_5OC_2H_4$, $CH_6H_{11}OC_2H_4$, $CH_3(OC_2H_4)_2$, $C_2H_5(OC_2H_4)_2$, $C_6H_5(OC_2H_4)_2$, $C_6H_5(OC_2H_4)_2$, $C_6H_{11}(OC_2H_4)_2$, $CH_3(OC_2H_4)_3$, $C_2H_5(OC_2H_4)_3$, $C_6H_5CH_2(OC_2H_4)_3$, $C_6H_5(OC_2H_4)_3$, $C_6H_{11}(OC_2H_4)_3$, $CH_3(OC_2H_4)_4$, $C_2H_5(OC_2H_4)_4$, $C_6H_5CH_2(OC_2H_4)_4$, $C_6H_5(OC_2H_4)_4$ or $C_6H_{11}(OC_2H_4)_4$.

$R^2$ is furthermore, for example, cyclopentyl, cyclohexyl, 2-, 3- or 4-methylcyclohexyl, cycloheptyl, phenoxymethyl, 2-phenoxyethyl, 2- or 3-phenoxypropyl, 2- or 4-phenoxybutyl, heptyl, octyl or 2-ethylhexyl.

If $R^1$ is substituted $C_1$–$C_6$-alkyl, suitable substituents are, for example, $C_1$–$C_4$-alkoxy, phenoxy, phenyl which may be substituted by $C_1$–$C_4$-alkyl, halogen, in particular fluorine, chlorine or bromine or $C_1$–$C_4$-alkoxy, or are $C_1$–$C_4$-mono- or dialkylcarbamoyl, pyrrolidinocarbonyl, piperidinocarbonyl, morpholinocarbonyl, piperazinocarbonyl, N-($C_1$–$C_4$-alkyl)-piperazinocarbonyl, phenylthio, phenylsulfonyl, anilino, $C_1$–$C_4$-alkanoylamino, benzoylamino, N-($C_1$–$C_4$-alkyl)-N-($C_1$–$C_4$-alkanoyl)-amino, N-($C_5$–$C_7$-cycloalkyl)-N-($C_1$–$C_4$-alkanoyl)-amino, N-phenyl-N-($C_1$–$C_4$-alkanoyl)-amino,N-($C_1$–$C_4$-alkyl)-N-benzoylamino,N-phenylN-benzoylamino, phenylsulfonylamino, N-($C_1$–$C_4$-alkyl)-N-phenylsulfonylamino, N-phenyl-N-phenylsulfonylamino, N,N'-($C_1$–$C_4$-dialkyl)-ureido, N-phenyl-N'-($C_1$–$C_4$-alkyl)ureido, N,N'-diphenylureido, morpholino or a radical of the formula

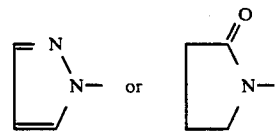

$R^1$ is furthermore, for example, phenyl which is unsubstituted or substituted by $C_1$–$C_4$-alkyl, $C_1$–$C_4$-alkoxy, halogen, in particular fluorine, chlorine or bromine, hydroxyl, phenoxy, phenylthio, phenylsulfonyl, $C_1$–$C_4$-alkoxycarbonyl, $C_1$–$C_4$-hydroxyalkyl, $C_1$–$C_4$-haloalkyl, $C_1$–$C_4$-(pyrrolidino)-, -(piperidino)-, -(morpholino)-, -(piperazino)- or -[N-($C_1$–$C_4$-alkyl)-piperazinoalkyl], $C_1$–$C_4$-phenylalkoxy, $C_1$–$C_4$-dialkylsulfamoyl or $C_1$–$C_4$-alkanoylamino, or is styryl which is unsubstituted or substituted by $C_1$–$C_4$-dialkylamino, or is methylthio, ethylthio, 2-(methoxycarbonyl)-ethylthio, 2-(ethoxycarbonyl)-ethylthio, 2cyanoethylthio, methylsulfinyl, ethylsulfinyl, 2-(methoxycarbonyl)-ethylsulfinyl, 2-(ethoxycarbonyl)ethylsulfinyl, 2-cyanoethylsulfinyl, methylsulfonyl, ethylsulfonyl, 2-(methoxycarbonyl)-ethylsulfonyl, 2-(ethoxycarbonyl)-ethylsulfonyl or 2-cyanoethylsulfonyl.

If $R^1$ or $R^2$ is substituted phenyl, suitable substituents are, for example, $C_1$–$C_4$-alkyl, $C_1$–$C_4$-alkoxy, cyano, halogen, in particular chlorine or bromine, $C_1$–$C_4$-alkanoylamino, sulfamoyl and $C_1$–$C_4$-mono- and dialkylsulfamoyl, where the alkyl chain may be interrupted by an oxygen atom.

$R^5$ is, for example, fluorine, chlorine, bromine, methoxycarbonyl, ethoxycarbonyl, propoxycarbonyl, isopropoxycarbonyl or butoxycarbonyl.

$R^3$ and $R^4$ together with the nitrogen atom which links them, are, for example, pyrrolidino, piperidino, morpholino, thiomorpholino, piperazino or N-($C_1$–$C_4$-alkyl)piperazino, such as N-methyl- or N-ethylpiperazino.

$R^3$ and $R^4$ are furthermore, for example, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,9-trioxadecyl, 1,3,6,9-trioxaundecyl1,3,6,9,12-tetraoxatridecyl, 3,6,9,12-tetraoxatetradecyl, 3-benzyloxypropyl or 6-phenoxy-4-oxahexyl.

$R^3$ is furthermore, for example, 2-cyanoethyl or 1- or 2-phenylethyl.

Preferred thiazoleazo dyes of the formula I are those in which X is a radical C—$R^5$, where $R^5$ has the abovementioned meanings.

Particularly preferred thiazoleazo dyes of the formula I are those in which X is a radical C—$R^5$, where $R^5$ is cyano.

Particularly preferred thiazoleazo dyes of the formula I are those in which $R^1$ is unsubstituted or substituted phenyl or a radical of the formula $R^6(-OC_2H_4)_n$, where $R^6$ is $C_1$-$C_4$-alkyl, cyclohexyl, benzyl or phenyl and n is 1, 2 or 3, $R^2$ is cyclohexyl, unsubstituted or methoxy substituted phenyl or thienyl, $R^3$ is $C_1$-$C_4$-alkyl, $R^4$ is $C_3$-$C_9$-alkyl whose alkyl chain is interrupted by from 1 to 3 oxygen atoms and may be substituted by phenoxy, and X is C—CN.

Particularly noteworthy thiazoleazo dyes of the formula I are those in which $R^1$ is unsubstituted or substituted phenyl or a radical of the formula $R^6(-OC_2H_4)_n$, where $R^6$ is phenyl and n is 2.

Further particularly noteworthy thiazoleazo dyes of the formula I are those in which $R^4$ is $C_1$- or $C_2$-alkoxyethyl, $C_1$- or $C_2$-alkoxypropyl, 3,6-dioxaheptyl, 3,6-dioxaoctyl, 4,7-dioxaoctyl, 4,7-dioxanonyl or 6-phenoxy-4-oxahexyl.

The novel thiazoleazo dyes are prepared in a conventional manner. For example, a 5-aminoisothiazole derivative of the formula

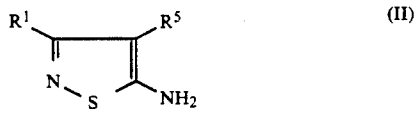

where $R^1$ and $R^5$ each have the abovementioned meanings, or a 5-aminothiadiazole derivative of the formula III

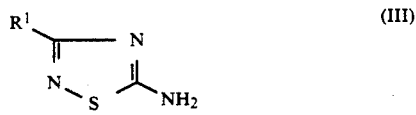

where $R^1$ has the abovementioned meanings, can be diazotized and the product coupled with a thiazole of the formula IV

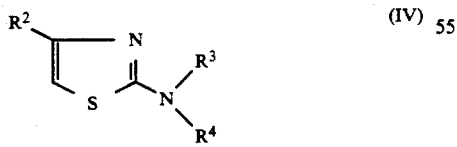

where $R^2$, $R^3$ and $R^4$ each have the abovementioned meanings.

5-Aminoisothiazoles of the formula II are known and are described in, for example, earlier patent application DE-A-3 804 394, and can be obtained by a method similar to the preparation process described there.

5-Aminothiadiazoles of the formula III are likewise known and are described in, for example, R. C. Elderfield, Heterocyclic Compounds, Vol. 7, John Wiley, New York, 1961, and can be obtained by a method similar to the methods stated there.

The thiazoles of the formula IV are in general also known compounds. They are described, for example, in U.S. Pat. No. 3 770 719 or in J. V. Metzger, Heterocyclic Compounds —Thiazole and its Derivatives, Vol. 34, Part 1, Interscience Publ., John Wiley, New York, 1979, or can be obtained by a method similar to the methods stated there.

The Examples give further details on the preparation of the novel dyes.

In general, the novel dyes of the formula I which have 5 or more oxygen atoms in the radicals $R^3$ and $R^4$ together are in the liquid state at room temperature.

The novel thiazoleazo dyes of the formula I can advantageously be used as disperse dyes for dyeing textile fibers, in particular cellulose esters or polyesters, as well as polyamides or blended fabrics of polyesters and cellulose fibers.

Dyeings having good wetfastness are obtained

To achieve an advantageous build-up of color, it may be advantageous in some cases to use mixtures of the novel dyes of formula I for dyeing.

The Examples which follow illustrate the invention. Examples 1 and 2 describe the preparation of the coupling component.

EXAMPLE 1

98 g of sodium thiocyanate were added to 300 ml of toluene, 100 ml of water and 5 g of a phase transfer catalyst. Thereafter, 181 g of thiophene-2-carbonyl chloride were added dropwise in the course of 1 hour and the mixture was stirred for 5 hours at from 20° to 25° C. The pH of the suspension was kept at 6–7. 168 g of bis 2-methoxyethyl)-amine were then added dropwise at from 20° to 25° C. in the course of 1 hour, after which the pH was corrected to 7–7.5 and stirring was continued overnight. 350 ml of water and 200 g of sodium hydroxide solution (50% by weight) were then added, and 124 g of chloroacetic acid were introduced at not more than 40° C. The mixture was then stirred for 5 hours with evaporative cooling. After the end of $CO_2$ elimination, the aqueous phase was separated off and the organic phase was extracted twice by shaking with water. The organic phase was subjected to distillation under reduced pressure (bath temperature: not more than 155° C.). 250 g of the coupling component of the formula

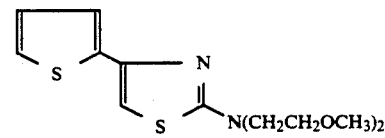

were obtained as a brown oil.

EXAMPLE 2

The procedure described in Example 1 was followed; except that, instead of thiophene-2-carbonyl chloride, 170 g of benzoyl chloride were used. 240 g of the coupling component of the formula

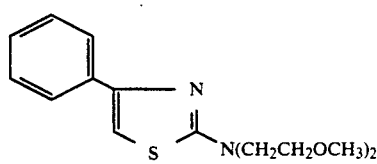

were obtained as a viscous, greenish oil, which rapidly solidified to give a colorless, crystalline product of melting point 47° C.

EXAMPLE 3

13.8 g of 3-(2-methoxyethyl)-4-cyano-5-aminoisothiazole were dissolved in 160 ml of glacial acetic acid and 35 ml of propionic acid. The solution was then cooled to 0°–5° C., and 32 g of 42% strength by weight nitrosylsulfuric acid were added dropwise at this temperature, and stirring was carried out for 3 hours. The mixture was then poured into a solution of 29.7 g of the thiazole of the formula

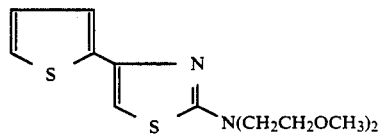

and 200 g of glacial acetic acid, 40 g of propionic acid and 30 ml of aqueous 10% strength by weight amidosulfonic acid solution. The mixture was then cooled to 0°–5° C. The coupling reaction took place immediately. The mixture was kept stirrable by adding about 800 ml of ice water and 200 g of ice. After the mixture had been buffered at pH 0–0.5 with sodium acetate, the precipitated dye of the formula

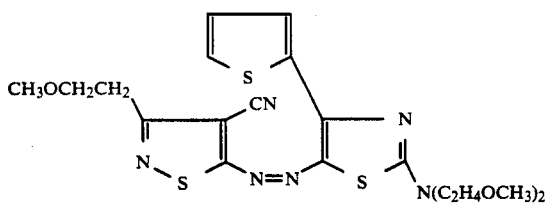

was filtered off under suction, washed with water and dried to give 47 g of a dark red to violet powder which dissolves in N,N-dimethylformamide to give a reddish blue solution and dyes polyethylene terephthalate fabric in reddish blue to navy hues.

$\lambda_{max}$ 580 nm (9 : 1 v/v N,N-dimethylformamide/glacial acetic acid).

EXAMPLE 4

13.8 g of 3-(2-methoxy-ethyl)-4-cyano-5-aminoisothiazole were diazotized similarly to Example 3 and the product was coupled with 27.9 g of the thiazole of the formula

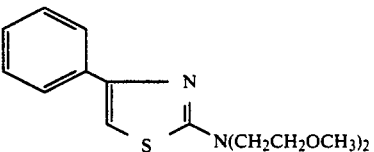

to give 48 g of a dark red powder of the formula

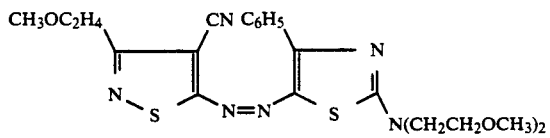

which dissolves in acetone to give a violet solution and dyes polyethylene terephthalate fabric in violet hues with excellent lightfastness. The dye has very good build-up properties.

$\lambda_{max}$: 554 nm (9 : 1 v/v N,N-dimethylformamide/glacial acetic acid).

EXAMPLE 5

17.2 g of 3-methyl-4-thiocyanato-5-aminoisothiazole were dissolved in 220 g of glacial acetic acid and 48 g of propionic acid at about 45° C. The solution was then cooled to 0°–5° C., 32 g of 42% strength by weight nitrosylsulfuric acid were added at this temperature and stirring was carried out for 3.5 hours at from 0° to 5° C. The resulting solution was added to a mixture of 29.2 g of 2-bis-(2-methoxyethyl)-amino-4-phenylthiazole, 50 g of glacial acetic acid and 10 g of an aqueous 10% strength by weight amidosulfonic acid solution. 8 g of concentrated hydrochloric acid and 400 g of ice water were also added and the mixture was cooled to 0° C. with ice. The coupling mixture was buffered at pH 0.8–1 with dilute sodium acetate solution. The precipitated dye of the formula

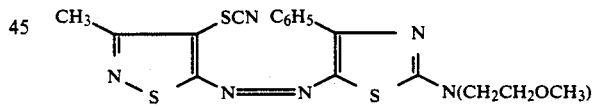

was filtered off under suction, washed and dried to give 42 g of a reddish violet powder which dissolves in N,N-dimethylformamide to give a violet solution and dyes polyethylene terephthalate in strong dull bluish red to violet hues.

$\lambda_{max}$: 542 nm (9 : 1 v/v N,N-dimethylformamide/glacial acetic acid).

EXAMPLE 6

20.7 g of 3-(thien-3-yl)-4-cyano-5-aminoisothiazole were sprinkled into a mixture of 125 g of sulfuric acid (71% strength by weight), 22 g of glacial acetic acid and 32 g of nitrosylsulfuric acid (42% strength by weight), cooled to 0° C. The diazotization mixture was stirred for 4 hours at from 0° to 5° C., and a yellow suspension was obtained. This mixture was combined at <8° C. with a solution, cooled to 0°–5° C., of 42.4 g of the thiazole of the formula

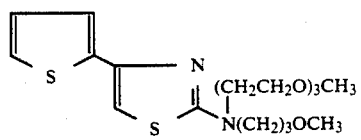

in 300 g of glacial acetic acid, 50 g of propionic acid, 50 g of ice and 1 g of amidosulfonic acid. During introduction of the diazonium salt, a little ice and ice water were added simultaneously so that the mixture remained stirrable. Stirring was continued for 10 minutes at about 0° C., after which the mixture was buffered at pH 0.2-0.4 with dilute, ice-cold sodium hydroxide solution. The dye of the formula

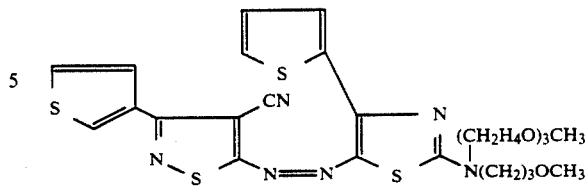

was isolated similarly to Example 5. It dissolves in N,N-dimethylformamide to give a solution having a navy hue and dyes polyethylene terephthalate in strong, blue hues. $\lambda_{max}$: 588 nm (9 : 1 v/v N,N-dimethylformamide/ glacial acetic acid).

The dyes listed in Tables 1 to 4 below are obtained in a similar manner.

TABLE 1

| Example No. | $R^1$ | $R^2$ | $R^3$ | $R^4$ | Hue |
|---|---|---|---|---|---|
| 7  | $C_6H_5$ | $C_6H_5$ | $C_2H_4OCH_3$ | $(C_2H_4O)_2OCH_3$ | violet |
| 8  | $C_2H_5OC_2H_4$ | $C_6H_5$ | $C_2H_4OCH_3$ | $C_2H_4OCH_3$ | bluish red |
| 9  | $C_6H_5$ | $C_6H_5$ | $C_2H_4OCH_3$ | $C_3H_6OC_2H_4OCH_3$ | violet |
| 10 | $C_6H_5$ | $C_6H_5$ | $C_3H_6OCH_3$ | $C_3H_6OC_2H_4OCH_3$ | violet |
| 11 | $C_6H_5$ | $C_6H_5$ | $C_3H_6OCH_3$ | $(C_2H_4O)_3CH_3$ | violet |
| 12 | $C_6H_5$ | thienyl | $C_3H_6OCH_3$ | $(C_2H_4O)_2CH_3$ | reddish blue |
| 13 | $C_6H_5$ | thienyl | $C_3H_6OCH_3$ | $(C_2H_4O)_3CH_3$ | reddish blue |
| 14 | $C_6H_5$ | thienyl | $C_2H_5$ | $(C_2H_4O)_3CH_3$ | reddish blue |
| 15 | $C_6H_5$ | thienyl | $C_2H_5$ | $C_3H_6OC_2H_4OCH_3$ | reddish blue |
| 16 | $C_6H_5$ | thienyl | $C_3H_7(n)$ | $C_3H_6OC_2H_4OCH_3$ | reddish blue |
| 17 | thienyl | thienyl | $C_2H_5$ | $(C_2H_4O)_3CH_3$ | blue |
| 18 | thienyl | thienyl | $C_2H_4OCH_3$ | $(C_2H_4O)_2CH_3$ | reddish blue |
| 19 | thienyl | thienyl | $C_2H_4OCH_3$ | $(C_2H_4O)_3CH_3$ | reddish blue |

TABLE 1-continued

[Structure: isothiazole-CN-R¹/R² with N=N-S-C(=N)-NR³R⁴ group]

| Example No. | R¹ | R² | R³ | R⁴ | Hue |
|---|---|---|---|---|---|
| 20 | 3-thienyl | 2-thienyl | $C_2H_4OCH_3$ | $(C_2H_4O)_3CH_3$ | reddish blue |
| 21 | 3-thienyl | 2-thienyl | $C_2H_4OCH_3$ | $(C_2H_4O)_2CH_3$ | blue |
| 22 | 3-thienyl | 2-thienyl | $C_2H_5$ | $(C_2H_4O)_2CH_3$ | blue |
| 23 | 3-thienyl | 2-thienyl | $C_2H_5$ | $(C_2H_4O)_3CH_3$ | blue |
| 24 | 3-thienyl | 2-thienyl | $C_2H_5$ | $C_3H_6OC_2H_4OCH_3$ | blue |
| 25 | $(CH_3)_2CH$ | 2-thienyl | $C_3H_7(n)$ | $C_3H_6OC_2H_4OCH_3$ | navy |
| 26 | $C_2H_5OC_2H_4$ | 2-thienyl | $C_3H_7(n)$ | $C_3H_6OC_2H_4OCH_3$ | navy |

TABLE 2

[Structure: isothiazole-R⁵-(thienyl) with N=N-S-C(=N)-NR³R⁴ group]

| Example No. | R¹ | R³ | R⁴ | R⁵ | Hue |
|---|---|---|---|---|---|
| 27 | $CH_3$ | $C_2H_4OCH_3$ | $C_2H_4OCH_3$ | CN | reddish blue |
| 28 | $C_2H_5$ | $C_2H_4OCH_3$ | $C_2H_4OCH_3$ | CN | reddish blue |
| 29 | $C_3H_7(n)$ | $C_2H_4OCH_3$ | $C_2H_4OCH_3$ | CN | reddish blue |
| 30 | $(CH_3)_2CH$ | $C_2H_4OCH_3$ | $C_2H_4OCH_3$ | CN | reddish blue |
| 31 | $CH_3OC_2H_4$ | $C_2H_4OCH_3$ | $C_3H_6OCH_3$ | CN | navy |
| 32 | $CH_3OC_2H_4$ | $C_2H_4OCH_3$ | $C_3H_6OC_2H_5$ | CN | navy |
| 33 | $CH_3OC_2H_4$ | $C_2H_4OC_2H_5$ | $C_3H_6OC_2H_5$ | CN | navy |
| 34 | $CH_3OC_2H_4$ | $C_2H_4OC_2H_5$ | $C_3H_6OCH_3$ | CN | navy |
| 35 | $CH_3OC_2H_4$ | $C_2H_5$ | $C_3H_6OCH_3$ | CN | navy |
| 36 | $CH_3OC_2H_4$ | $C_2H_5$ | $C_3H_6OC_2H_4OCH_3$ | CN | navy |
| 37 | $CH_3OC_2H_4$ | $C_2H_5$ | $C_3H_6OC_2H_4OC_2H_5$ | CN | navy |
| 38 | $CH_3OC_2H_4$ | $C_2H_5$ | $(C_2H_4O)_2CH_3$ | CN | navy |
| 39 | $CH_3OC_2H_4$ | $C_3H_7(n)$ | $(C_2H_4O)_2CH_3$ | CN | navy |
| 40 | $CH_3OC_2H_4$ | $C_3H_7(n)$ | $C_3H_6OC_2H_4OCH_3$ | CN | navy |
| 41 | $CH_3$ | $C_2H_5$ | $C_3H_6OC_2H_4OCH_3$ | SCN | bluish violet |
| 42 | $CH_3$ | $C_2H_5$ | $C_3H_6OC_2H_4OCH_3$ | SCN | bluish violet |
| 43 | $CH_3$ | $C_2H_4OCH_3$ | $C_2H_4OCH_3$ | SCN | bluish violet |

TABLE 3

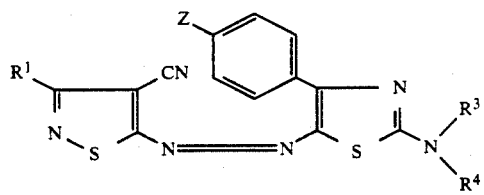

| Example No. | R¹ | R³ | R⁴ | Z | Hue |
|---|---|---|---|---|---|
| 44 | $CH_3$ | $C_2H_4OCH_3$ | $C_2H_4OCH_3$ | H | violet |
| 45 | $C_2H_5$ | $C_2H_4OCH_3$ | $C_2H_4OCH_3$ | H | violet |
| 46 | $(CH_3)_2CH$ | $C_2H_4OCH_3$ | $C_2H_4OCH_3$ | H | violet |
| 47 | $CH_3OC_2H_4$ | $C_3H_6OCH_3$ | $C_2H_4OCH_3$ | H | violet |
| 48 | $CH_3OC_2H_4$ | $C_2H_4OCH_3$ | $C_2H_4OCH_3$ | Cl | violet |
| 49 | $CH_3OC_2H_4$ | $C_3H_6OCH_3$ | $C_2H_5$ | H | violet |
| 50 | $CH_3OC_2H_4$ | $C_2H_5$ | $C_2H_4OC_2H_4OCH_3$ | H | violet |
| 51 | $CH_3OC_2H_4$ | $C_2H_5$ | $C_2H_4OC_2H_4OCH_3$ | Cl | violet |
| 52 | $CH_3OC_2H_4$ | $CH_3$ | $C_2H_4OC_2H_4OCH_3$ | H | violet |
| 53 | $CH_3OC_2H_4$ | $C_3H_6OC_2H_5$ | $C_2H_4OCH_3$ | H | violet |
| 54 | $CH_3OC_2H_4$ | $C_3H_6OC_2H_5$ | $CH_3$ | H | violet |
| 55 | $CH_3OC_2H_4$ | $C_2H_5$ | $C_2H_4OCH_3$ | $OCH_3$ | bluish violet |
| 56 | $CH_3$ | $C_2H_5$ | $C_2H_4OCH_3$ | $OCH_3$ | bluish violet |

TABLE 4

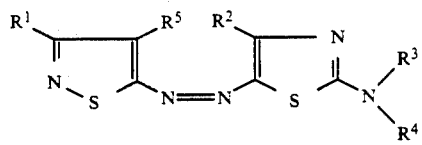

| Example No. | R¹ | R² | R³ | R⁴ | R⁵ | Hue |
|---|---|---|---|---|---|---|
| 44 | $CH_3$ | $C_6H_5$ | $C_2H_4OCH_3$ | $C_2H_4OCH_3$ | H | red |
| 45 | $CH_3$ | $C_6H_5$ | $C_2H_4OCH_3$ | $C_2H_4OCH_3$ | Cl | red |
| 46 | $CH_3$ | $C_6H_5$ | $C_2H_4OCH_3$ | $C_2H_4OCH_3$ | Br | red |
| 47 | $CH_3$ | $C_6H_5$ | $C_2H_4OCH_3$ | $C_2H_4OCH_3$ | SCN | violet |
| 48 | $CH_3$ | $C_6H_5$ | $C_3H_6OCH_3$ | $C_2H_4OCH_3$ | SCN | violet |
| 49 | $C_6H_5$ | $C_6H_5$ | $C_3H_6OCH_3$ | $C_2H_4OCH_3$ | CN | violet |
| 50 | $C_6H_5$ | 2-thienyl | $C_3H_6OCH_3$ | $C_2H_4OCH_3$ | CN | reddish blue |
| 51 | $C_6H_5$ | 2-thienyl | $C_3H_6OCH_3$ | $C_2H_4OCH_3$ | SCN | reddish blue |
| 52 | $CH_3$ | 2-thienyl | $C_3H_6OCH_3$ | $C_2H_4OCH_3$ | SCN | reddish blue |
| 53 | $CH_3$ | 2-thienyl | $C_2H_4OCH_3$ | $C_2H_4OCH_3$ | SCN | violet |
| 54 | 3-pyridyl | 2-thienyl | $C_3H_6OCH_3$ | $(C_2H_4O)_2C_2H_5$ | CN | reddish blue |
| 55 | $C_6H_5$ | 2-thienyl | $C_3H_6OCH_3$ | $(C_2H_4O)_2C_2H_5$ | CN | reddish blue |
| 56 | $C_6H_5-CH_2$ | $C_6H_5$ | $C_3H_6OCH_3$ | $(C_2H_4O)_2C_2H_5$ | CN | violet |

TABLE 4-continued

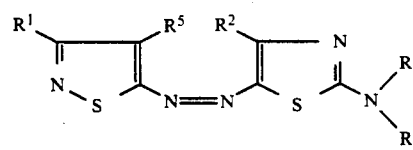

| Example No. | R¹ | R² | R³ | R⁴ | R⁵ | Hue |
|---|---|---|---|---|---|---|
| 57 | CH₃OC₂H₄ | (2-thienyl) | C₃H₆OCH₃ | C₃H₆OCH₃ | CN | navy |
| 58 | C₂H₅OC₂H₄ | (2-thienyl) | C₃H₆OCH₃ | C₃H₆OCH₃ | CN | navy |
| 59 | C₂H₅OC₂H₄ | (2-thienyl) | C₃H₆OCH₃ | C₂H₄OCH₃ | CN | navy |
| 60 | (2-oxopyrrolidin-1-yl)CH₂CH₂ | (2-thienyl) | C₃H₆OC₂H₅ | C₂H₄OCH₃ | CN | reddish blue |
| 61 | (2-thienyl) | (2-thienyl) | C₂H₄OC₂H₅ | C₃H₆OCH₃ | CN | blue |
| 62 | (2-thienyl) | (2-thienyl) | C₃H₆OCH₃ | C₃H₆OC₂H₅ | CN | blue |

*Note: R¹ and R² expressed with the following formula in image:*
$R^1, R^5, R^2$ substituents on a thiadiazole-azo-thiazole system with $-N(R^3)(R^4)$ group.

EXAMPLE 63

A mixture of 200 g of glacial acetic acid, 50 g of propionic acid and 20 g of 96% strength by weight sulfuric acid was stirred at room temperature with 15 g of finely milled 3-methylthio-5-aminothiadiazole. It was then cooled to 1°-3° C., 32 g of 42% strength by weight nitrosylsulfuric acid were added dropwise at this temperature while cooling, and stirring was continued for 2.5 hours at from 0° to 5° C. The resulting, orange diazonium salt solution was added to a solution of 31.2 g of the thiazole of the formula

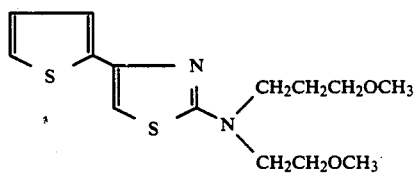

in 35 g of glacial acetic acid, which was diluted with a mixture of 8 ml of concentrated hydrochloric acid, 300 ml of water and 1 g of amidosulfonic acid and cooled with ice to 0° C. Coupling took place completely at pH<0.8. The pH of the coupling mixture was increased to 0.3-0.5 with dilute sodium hydroxide solution and stirring was continued for 1 hour, and the precipitate was filtered off under suction, washed and dried. 46.5 g of a violet dye of the formula

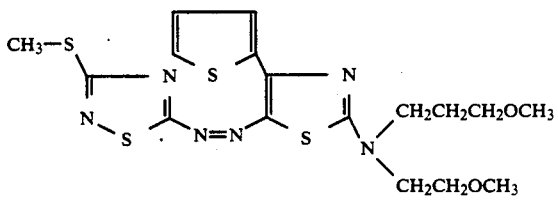

which dissolves in N,N-dimethylformamide to give a reddish blue solution were obtained $\lambda_{max}$: 568 nm (9 : 1 v/v N,N-dimethylformamide/glacial acetic acid).

The dye dyes polyester fabric in strong bluish violet hues having good lightfastness and fastness to heat-setting.

The dyes listed in Table 5 below are obtained in a similar manner.

TABLE 5

| Example No. | R¹ | R² | R³ | R⁴ | Hue |
|---|---|---|---|---|---|
| 64 | SCH$_3$ | C$_6$H$_5$ | C$_2$H$_4$OCH$_3$ | C$_2$H$_4$OCH$_3$ | reddish violet |
| 65 | SCH$_3$ | thienyl | C$_2$H$_4$OCH$_3$ | C$_2$H$_4$OCH$_3$ | reddish blue |
| 66 | SC$_2$H$_5$ | thienyl | C$_3$H$_6$OCH$_3$ | C$_2$H$_4$OCH$_3$ | reddish blue |
| 67 | SCH$_3$ | thienyl | C$_3$H$_6$OCH$_3$ | C$_3$H$_6$OCH$_3$ | reddish blue |
| 68 | SCH$_3$ | C$_6$H$_5$ | C$_3$H$_6$OCH$_3$ | C$_2$H$_4$OCH$_3$ | violet |
| 69 | SCH$_3$ | thienyl | C$_3$H$_6$OCH$_3$ | C$_3$H$_6$OCH$_3$ | bluish violet |
| 70 | SCH$_3$ | CH$_3$O-C$_6$H$_4$- | C$_3$H$_6$OCH$_3$ | C$_2$H$_4$OCH$_3$ | violet |
| 71 | SCH$_3$ | C$_6$H$_5$ | C$_2$H$_5$ | (C$_2$H$_4$O)$_2$CH$_3$ | violet |
| 72 | SCH$_3$ | C$_6$H$_5$ | C$_2$H$_5$ | (C$_2$H$_4$O)$_2$C$_2$H$_5$ | violet |
| 73 | SCH$_3$ | thienyl | C$_2$H$_5$ | (C$_2$H$_4$O)$_2$C$_2$H$_5$ | bluish violet |
| 74 | SCH$_3$ | thienyl | C$_2$H$_5$ | (C$_2$H$_4$O)$_2$CH$_3$ | bluish violet |
| 75 | SCH$_3$ | thienyl | C$_3$H$_6$OCH$_3$ | (C$_2$H$_4$O)$_2$C$_2$H$_5$ | bluish violet |
| 76 | SCH$_3$ | thienyl | C$_2$H$_4$OC$_2$H$_5$ | C$_3$H$_6$OCH$_3$ | bluish violet |
| 77 | CH$_3$O$_2$CC$_2$H$_4$S | thienyl | C$_2$H$_5$ | C$_3$H$_6$OCH$_3$ | bluish violet |
| 78 | CH$_3$O$_2$CC$_2$H$_4$S | C$_6$H$_5$ | C$_6$H$_5$ | C$_3$H$_6$OCH$_3$ | violet |
| 79 | CH$_3$O$_2$CC$_2$H$_4$S | thienyl | C$_2$H$_5$ | C$_3$H$_6$OC$_2$H$_5$ | bluish violet |

EXAMPLE 80

13.9 g of 3-methyl-4-cyano-5-aminoisothiazole were dissolved in a mixture of 210 ml of glacial acetic acid and 50 ml of propionic acid at 50° C. The solution was then cooled to 10° C., after which 14 g of concentrated sulfuric acid and then, at from 0° to 4° C., 32 g of nitrosylsulfuric acid (45% strength by weight) were added dropwise. The mixture was stirred for 3 hours at from 0° to 5° C., after which a clear diazonium salt solution was obtained. This was run, with thorough stirring, into 30 g of the coupling component of the formula

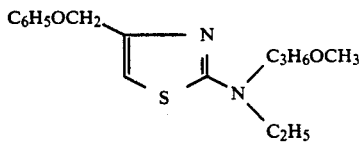

dissolved in a mixture, cooled to 0°–5° C., of 150 g of glacial acetic acid, 40 g of propionic acid and 0.5 g of urea. During this procedure, the temperature was kept at ≦5° C. by cooling. Thereafter, the mixture was buffered by adding sodium acetate at ≦5° C. in such a way that the free sulfuric acid was bound (pH of the mixture about 0.5–1.5). The resulting dye of the formula

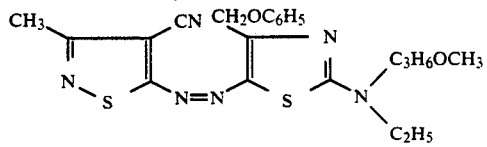

was precipitated by adding water, filtered off under suction, washed and dried. Yield: 43 g.

The dye dissolves in N,N-dimethylformamide to give a bluish red solution and dyes polyester fabric in lightfast, bluish red hues. The absorption maximum, measured in a mixture of N,N-dimethylformamide and glacial acetic acid (9 : 1 v/v), is 526 nm.

EXAMPLE 81

13.9 g of 3-methyl-4-cyano-5-aminoisothiazole were diazotized similarly to Example 80 and the product was combined with 29 g of the coupling component of the formula

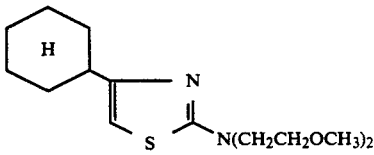

which had been dissolved in a mixture of 150 g of glacial acetic acid and 40 g of propionic acid at 2° C. Thereafter, 35 g of dry sodium acetate were sprinkled in while stirring and cooling at ≦6° C., the coupling reaction being initiated.

After the end of the reaction, the resulting dye of the formula

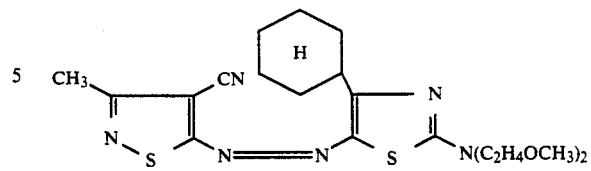

was precipitated with water and was isolated similarly to Example 1. 42 g of a dark red powder were obtained, the said powder dissolving in N,N-dimethylformamide to give a pale bluish red solution and dyeing polyester fabric in bluish red hues having very good fastness properties. The UV spectrum has a virtually symmetric curve in the visible spectral range. The absorption maximum is 525 nm.

EXAMPLE 82

13.9 g of 3-methyl-4-cyano-5-aminoisothiazole were dissolved at 50° C. in a mixture of 210 ml of glacial acetic acid and 50 ml of propionic acid. The solution was then cooled to 10° C., and 14 g of concentrated sulfuric acid (96% strength by weight) were added dropwise. Thereafter, the suspension was cooled to 2°–4° C. and 32 g of nitrosylsulfuric acid (44% strength by weight) were added dropwise at this temperature. After stirring had been carried out for 3 hours, a clear diazonium salt solution was obtained. Excess nitrous acid was then destroyed with urea. The diazonium salt solution was then run into a solution of 25.0 g of the coupling component of the formula

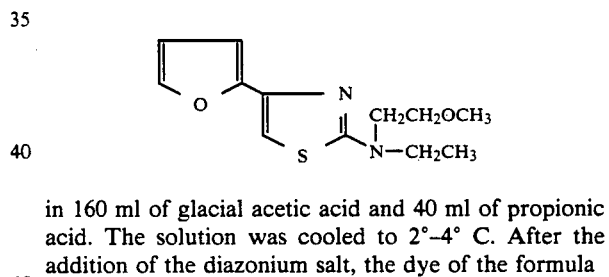

in 160 ml of glacial acetic acid and 40 ml of propionic acid. The solution was cooled to 2°–4° C. After the addition of the diazonium salt, the dye of the formula

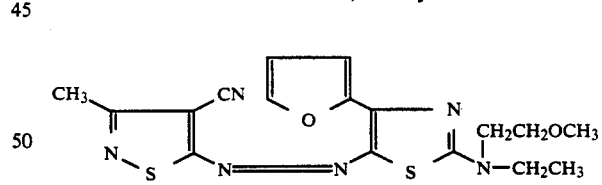

was obtained. The dye was precipitated by adding water. After the mixture had been buffered at pH 0–0.5 with sodium hydroxide solution, the dye was isolated by filtration under suction, washing with water and drying. 39.6 g of a bluish black powder were obtained, the said powder dissolving in N,N-dimethylformamide to give a reddish blue solution. The absorption maximum, measured in a mixture of N,N-dimethylformamide and glacial acetic acid (9 : 1 v/v), is 577 nm.

The dye dyes polyester fabric in reddish blue to navy hues.

Because of its good affinity to polyester fibers, it is also suitable for (sublimation) transfer printing.

The dyes listed in Tables 6, 7 and 8 below are obtained in a similar manner.

TABLE 6

(structure: R¹ substituted isothiazole, with R⁵, R² on diazo bridge to thiazole with N=C-NR³R⁴ group)

| Example No. | R¹ | R⁵ | R² | R³ | R⁴ | Hue |
|---|---|---|---|---|---|---|
| 83 | CH₃ | SCN | cyclohexyl (H) | C₂H₅ | C₃H₆OCH₃ | red |
| 84 | CH₃ | CN | CH₂OC₆H₅ | C₂H₅ | C₃H₆OCH₃ | bluish red |
| 85 | CH₃ | CN | CH₂OC₆H₅ | C₂H₄OCH₃ | C₂H₄OCH₃ | bluish red |
| 86 | CH₃ | CN | CH₂OC₆H₅ | C₂H₅ | C₃H₆OC₂H₄OCH₃ | bluish red |
| 87 | C₂H₅ | CN | CH₂OC₆H₅ | C₂H₅ | C₃H₆OC₂H₄OCH₃ | bluish red |
| 88 | C₃H₅ | CN | CH₂OC₆H₅ | C₂H₄OCH₃ | C₂H₄OCH₃ | bluish red |
| 89 | C₂H₅ | CN | 4-methylcyclohexyl (H, CH₃) | C₂H₄OCH₃ | C₃H₆OC₂H₄OCH₃ | bluish red |
| 90 | CH₃ | CN | 4-methylcyclohexyl (H, CH₃) | C₂H₄OCH₃ | C₃H₆OC₂H₄OCH₃ | bluish red |
| 91 | CH₃ | Cl | cyclohexyl (H) | C₂H₄OCH₃ | C₃H₆OC₂H₄OCH₃ | yellowish red |
| 92 | CH₃ | Br | cyclohexyl (H) | C₂H₄OCH₃ | C₃H₆OC₂H₄OCH₃ | yellowish red |
| 93 | C₆H₅ | CN | CH₂OC₆H₅ | C₂H₅ | C₃H₆OC₂H₄OCH₃ | bluish red |
| 94 | thienyl | CN | CH₂OC₆H₅ | C₂H₅ | C₃H₆OC₂H₄OCH₃ | bluish red |
| 95 | CH₃OC₂H₄ | CN | CH₂OC₆H₅ | C₂H₅ | C₃H₆OC₂H₄OCH₃ | bluish red |
| 96 | CH₃OC₂H₄ | CN | CH₂OC₆H₅ | C₂H₅ | C₂H₄OCH₃ | bluish red |
| 97 | CH₃OC₂H₄ | CN | CH₂OC₆H₅ | C₂H₅ | C₃H₆OCH₃ | bluish red |
| 98 | CH₃(OC₂H₄)₂ | CN | CH₂OC₆H₅ | C₂H₅ | C₂H₅ | bluish red |
| 99 | C₂H₅(OC₂H₄)₂ | CN | CH₂OC₆H₅ | C₂H₅ | C₂H₅ | bluish red |
| 100 | C₂H₅(OC₂H₄)₂ | CN | CH₂OC₆H₅ | C₂H₅ | C₃H₆OCH₃ | bluish red |
| 101 | C₆H₅(OC₂H₄)₂ | CN | CH₂OC₆H₅ | C₂H₅ | C₂H₅ | bluish red |
| 102 | C₆H₅(OC₂H₄)₂ | CN | CH₂OC₆H₅ | C₂H₅ | C₃H₆OCH₃ | bluish red |
| 103 | CH₃(OC₂H₄)₂ | CN | pyridyl | C₂H₅ | C₂H₅ | dull bluish red |

TABLE 7

| Example No. | R¹ | R³ | R⁴ | Hue |
|---|---|---|---|---|
| 104 | $CH_3$ | $C_2H_5$ | $C_2H_4OCH_3$ | red |
| 105 | $CH_3$ | $CH_3$ | $C_3H_6OCH_3$ | bluish red |
| 106 | $CH_3$ | $C_2H_4OCH_3$ | $C_3H_6OCH_3$ | bluish red |
| 107 | $CH_3$ | $C_2H_5$ | $C_2H_4OC_2H_5$ | bluish red |
| 108 | $CH_3$ | $C_3H_6OCH_3$ | $C_3H_6OCH_3$ | bluish red |
| 109 | $CH_3$ | $C_2H_5$ | $C_3H_6OC_2H_4OCH_3$ | bluish red |
| 110 | $C_2H_5$ | $C_2H_5$ | $C_3H_6OC_2H_4OCH_3$ | bluish red |
| 111 | $CH_3OC_2H_4$ | $C_2H_5$ | $C_2H_4OCH_3$ | bluish red |
| 112 | $CH_3OC_2H_4$ | $C_2H_5$ | $C_3H_6OCH_3$ | bluish red |
| 113 | $C_6H_5$ | $C_2H_5$ | $C_3H_6OC_2H_4OCH_3$ | bluish red |
| 114 | thienyl | $C_2H_5$ | $C_3H_6OC_2H_4OCH_3$ | bluish red |
| 115 | phenyl-$OC_2H_4OC_2H_4$ | $C_2H_5$ | $C_2H_5$ | bluish red |
| 116 | phenyl-$OC_2H_4OC_2H_4$ | $C_2H_5$ | $C_2H_4OCH_3$ | bluish red |
| 117 | phenyl-$OC_2H_4OC_2H_4$ | $C_2H_5$ | $C_3H_6OCH_3$ | bluish red |
| 118 | $CH_3(OC_2H_4)_2$ | $C_2H_5$ | $C_2H_5$ | bluish red |
| 119 | $CH_3OC_2H_4$ | $C_2H_5$ | $C_3H_6OC_2H_4OC_6H_5$ | bluish red |
| 120 | $CH_3$ | $C_2H_5$ | $C_3H_6OC_2H_4OC_6H_5$ | bluish red |
| 121 | $CH_3OC_2H_4$ | $CH_2CH_2-O-CH_2CH_2$ | | bluish red |
| 122 | $CH_3(OC_2H_4)_2$ | $CH_2CH_2-O-CH_2CH_2$ | | bluish red |
| 123 | methylthienyl | $C_2H_5$ | $C_3H_6OC_2H_4OCH_3$ | bluish red |

TABLE 8

| Example No. | R¹ | R² | R³ | X | n | λmax [nm] |
|---|---|---|---|---|---|---|
| 124 | $C_2H_5(OC_2H_4)_2$ | $C_6H_5$ | $C_2H_5$ | C—CN | 0 | 554 |
| 125 | $C_2H_5(OC_2H_4)_2$ | methylthienyl | $C_2H_5$ | C—CN | 0 | 581 |
| 126 | $C_6H_5CH_2OC_2H_4$ | methylthienyl | $C_2H_5$ | C—CN | 0 | 581 |

TABLE 8-continued (structure shown with R¹, R², R³, X, N=N, S, (O)ₙC₂H₅ groups)

| Example No. | R¹ | R² | R³ | X | n | λmax [nm] |
|---|---|---|---|---|---|---|
| 127 | C₆H₅(OC₂H₄)₂ | (thiophene-2-yl) | C₂H₅ | C—CN | 0 | 580 |
| 128 | C₂H₅OC₂H₄ | C₆H₅ | C₂H₄CN | C—CN | 1 | 544 |
| 129 | (morpholinyl-N-CH₂) | C₆H₅ | C₃H₆OCH₃ | C—CN | 0 | 552 |
| 130 | CH₃OC₂H₄ | C₆H₅ | C₂H₄CN | C—CN | 1 | 544 |
| 131 | C₆H₅ | C₆H₅ | C₂H₄CN | C—CN | 1 | 552 |
| 132 | CH₃ | (thiophene-2-yl) | CH₂(C₂H₄O)₂C₆H₅ | C—CN | 0 | 581 |
| 133 | CH₃O—C₂H₄ | (4-methoxyphenyl) | C₂H₄OCH₃ | C—CN | 0 | 569 |
| 134 | NC—C₂H₄S | C₆H₅ | C₂H₅ | N | 0 | 540 |
| 135 | NC—C₂H₄S | (thiophene-2-yl) | C₂H₅ | N | 0 | 565 |
| 136 | CN | (thiophene-2-yl) | CH₂(C₂H₄O)₂C₂H₅ | —C—CN | 0 | 578 |
| 137 | NC—C₂H₄S | C₆H₅ | C₃H₆OCH₃ | N | 0 | 537 |
| 138 | CN | (thiophene-2-yl) | CH₂(C₂H₄O)₂C₂H₅ | C—CN | 0 | 595 |
| 139 | CH₃OC₂H₄ | (cyclohexyl-H) | C₃H₆OCH₃ | C—CN | 0 | 528 |
| 140 | (thiophene-2-yl) | (thiophene-2-yl) | CH₂(C₂H₄O)₂CH₃ | C—CN | 0 | 592 |
| 141 | (thiophene-2-yl) | (thiophene-2-yl) | CH₂(C₂H₄O)₂CH₃ | C—CN | 0 | 588 |
| 142 | (pyrazolyl-N-C₂H₄) | (thiophene-2-yl) | CH₂(C₂H₄O)₃CH₃ | C—CN | 0 | 581 |

TABLE 8-continued

![structure with R1, R2, R3, X, (O)nC2H5]

| Example No. | R¹ | R² | R³ | X | n | λmax [nm] |
|---|---|---|---|---|---|---|
| 143 | Cl | thienyl | CH₂(C₂H₄O)₂CH₃ | C—CN | 0 | 592 |
| 144 | Cl | thienyl | CH₂(C₂H₄O)₂C₂H₅ | C—CN | 0 | 592 |
| 145 | CH₃OC₃H₆(C₂H₅)NSO₂-phenyl | thienyl | C₂H₄OCH₃ | C—CN | 0 | 590 |
| 146 | NC-phenyl | thienyl | CH₂(C₂H₄O)₂C₂H₅ | C—CN | 0 | 584 |
| 147 | CH₃-phenyl | thienyl | CH₂(C₂H₄O)₂CH₃ | C—CN | 0 | 589 |
| 148 | CH₃O-phenyl | thienyl | CH₂(C₂H₄O)₂CH₃ | C—CN | 0 | 590 |
| 149 | m-CH₃-phenyl | thienyl | CH₂(C₂H₄O)₂CH₃ | C—CN | 0 | 590 |

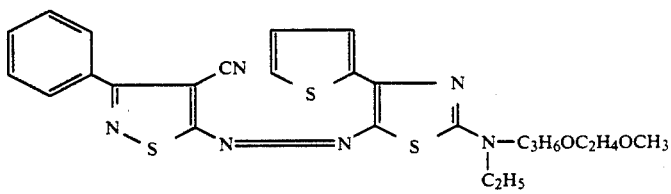

We claim:

1. A thiazoleazo dye of the formula I

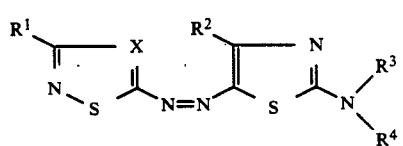

(I)

wherein X is a radical C—R⁵, R⁵ being cyano, halogen, C₁-C₄-alkoxycarbonyl or thiocyanato, R¹ is phenyl, phenyl substituted C₁-C₆-alkoxy, sulfamoyl or C₁-C₄-mono- and dialkylsulfamoyl, C₁-C₄-mono and dialkylsulfamoyl where the alkyl chain is interrupted by an oxygen atom, furyl, thienyl, C₁-C₄-alkylthienyl, halothienyl or pyridyl, R² is phenyl, or thienyl, R³ is C₁-C₄-alkyl, or C₃-C₁₂-alkyl whose alkyl chain is interrupted by from 1 to 4 oxygen atoms, and R⁴ is C₃-C₈-alkyl whose alkyl chain is interrupted by from 1 to 4 oxygen atoms.

2. A thiazoleazo dye as claimed in claim 1, wherein R⁵ is cyano.

3. The thiazoleazo dye according to claim 1, of the formula

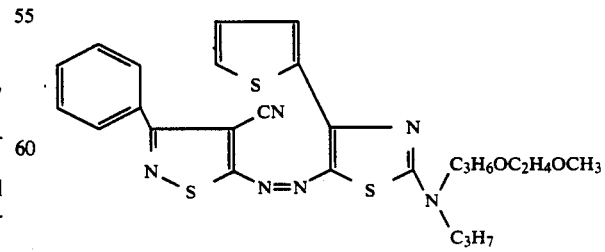

4. The thiazoleazo dye according to claim 1, of the formula